United States Patent
Fennel et al.

(10) Patent No.: US 6,807,848 B1
(45) Date of Patent: Oct. 26, 2004

(54) METHOD FOR DETERMINING PARAMETERS

(75) Inventors: Helmut Fennel, Bad Soden (DE); Michael Latarnik, deceased, late of Friedrichsdorf (DE), by Christine Latarnik, Eva-Marie Latarnik, Syliva Latarni, legal representatives

(73) Assignee: Continental Teves AG & Co. KG, Frankfurt (DE)

(*) Notice: Subject to any disclaimer, the term of this patent is extended or adjusted under 35 U.S.C. 154(b) by 0 days.

(21) Appl. No.: 09/914,813

(22) PCT Filed: Mar. 16, 2000

(86) PCT No.: PCT/EP00/02354

§ 371 (c)(1),
(2), (4) Date: Jul. 22, 2002

(87) PCT Pub. No.: WO00/55023

PCT Pub. Date: Sep. 21, 2000

(30) Foreign Application Priority Data

Mar. 17, 1999 (DE) .......................................... 199 11 788
Mar. 14, 2000 (DE) .......................................... 100 11 796

(51) Int. Cl.$^7$ ............................ G01N 11/00; G01L 5/28; B60T 17/00
(52) U.S. Cl. .............................. 73/54.01; 73/121; 303/1
(58) Field of Search ............................... 73/54.01, 121; 303/1

(56) References Cited

U.S. PATENT DOCUMENTS

| 3,882,967 A | | 5/1975 | Gulla et al. | |
| 4,520,661 A | | 6/1985 | Tamai et al. | |
| 5,971,503 A | * | 10/1999 | Joyce et al. | ................ 303/191 |
| 6,007,165 A | * | 12/1999 | Sato et al. | .................. 303/191 |
| 6,244,672 B1 | * | 6/2001 | Hachtel | ................. 303/122.09 |
| 6,267,010 B1 | * | 7/2001 | Hatanaka et al. | ............. 73/756 |
| 6,312,061 B1 | * | 11/2001 | Schliebe et al. | .............. 303/20 |

FOREIGN PATENT DOCUMENTS

| DE | 37 41 971 | 6/1989 |
| DE | 39 12 235 | 10/1990 |
| DE | 195 47 111 | 6/1997 |
| DE | 199 20 448 | 12/1999 |
| EP | 921 047 | 6/1999 |
| WO | WO 96/20102 | 7/1996 |

* cited by examiner

Primary Examiner—Michael Cygan

(57) ABSTRACT

The present invention relates to a method for determining parameters for the viscosity or temperature of a brake fluid of a vehicle which is supplied to the wheel brakes by way of a motor-and-pump assembly equipped with actuatable valves and a hydraulic unit, with which an electronic control unit is associated. To ensure a high degree of control dynamics even at low temperatures, it is suggested that the temperature of the hydraulic unit is measured by way of a temperature-sensitive element which connects the motor-and-pump assembly to the electronic control unit, and the parameters are determined by way of the temperature of the hydraulic unit.

19 Claims, 4 Drawing Sheets

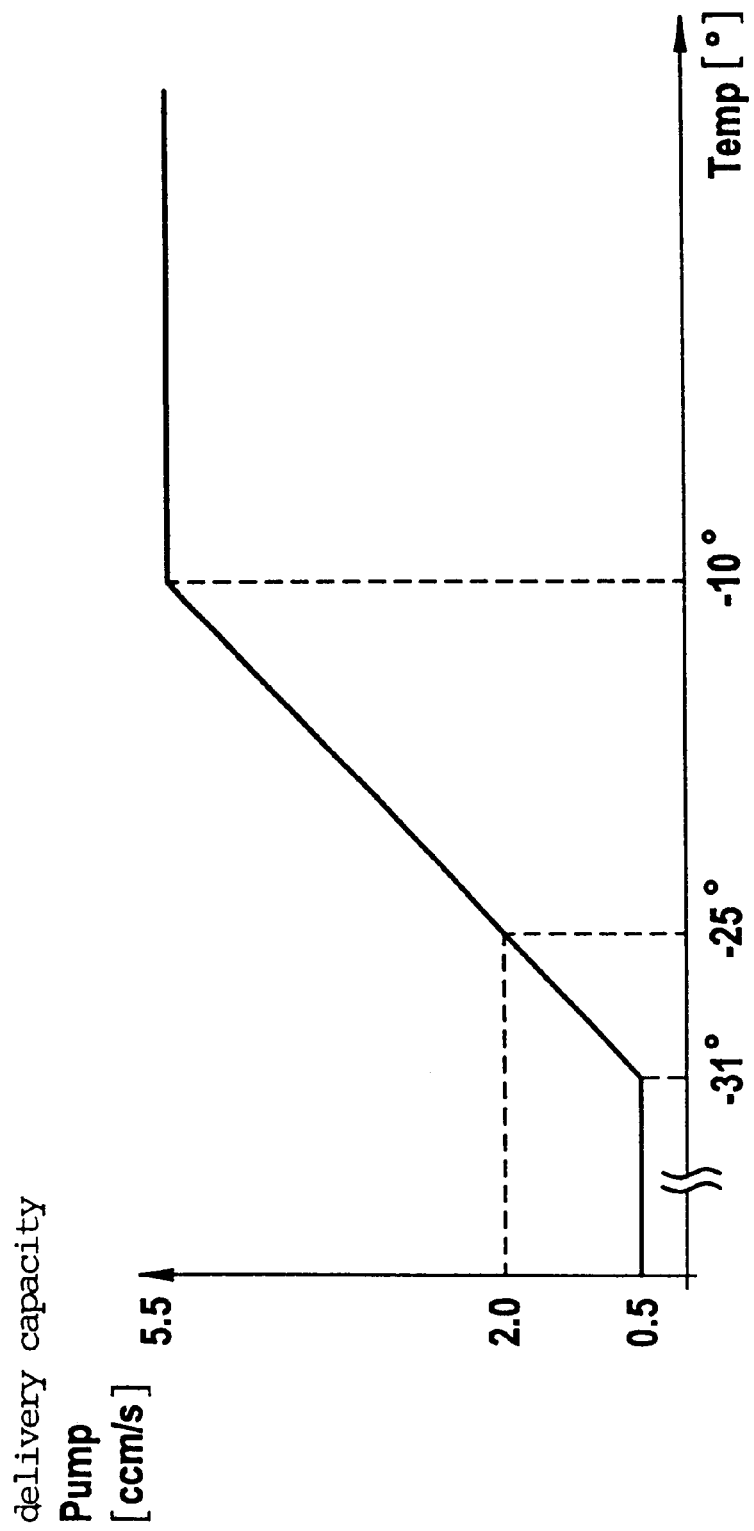

METHOD FOR DETERMINING PARAMETERS

FIELD OF THE INVENTION

The present invention relates to a method for determining parameters for the viscosity and/or temperature of a brake fluid of a vehicle.

BACKGROUND OF THE INVENTION

It is known that the, viscosity of a brake fluid or hydraulic fluid is greatly responsive to temperatures. High viscosity at low fluid temperatures, i.e., at a low temperature below −10 degrees C., for example, in the starting period of an automotive vehicle impairs the controllability of the brake pressure of a controlled hydraulic brake system. It is problematic when brake fluid, e.g. within a driving stability control function, i.e. without being influenced by the driver, shall be conducted especially quickly from the brake fluid reservoir to a wheel brake. With temperatures dropping, the viscosity of the brake fluid rises overproportionally. At very low temperatures, the result is that the brake fluid cannot be aspirated at a sufficiently quick rate and, in addition, the loss in pressure in the pipe line increases with rising viscosity. These obstacles cause a decelerated brake intervention. In driving stability control, however, there is the general demand of effecting a quick brake intervention. To solve this problem, devices have already been proposed which provide an auxiliary pressure source or a precharging pump (WO 96/20102). Because this entails considerable extra cost, the use of these devices is increasingly avoided.

In view of the above, an object of the present invention is to ensure, with little effort, the functioning of a hydraulic vehicle brake system with all its partial functions, such as anti-lock function, traction slip function, and driving stability function, even when exposed to very low outside temperatures.

Favorably, the method is used in a driving-dynamics control system which serves to assist the driver of a vehicle in critical driving situations. 'Vehicle' in this context refers to an automotive vehicle with four wheels which is equipped with a hydraulic brake system. In the hydraulic brake system, brake pressure can be built up by the driver by means of a pedal-operated master cylinder. Each wheel has a brake with which at least one inlet valve and one outlet valve is associated. By way of the inlet valves, the wheel brakes are connected to the master cylinder, while the outlet valves lead to an unpressurized reservoir or low-pressure accumulator. Finally, there is provision of an auxiliary-pressure source, generally, a motor-and-pump assembly which is able to build up pressure in the wheel brakes even independently of the position of the brake pedal. The inlet and outlet valves and the further valves arranged in the brake circuit are electromagnetically operable by actuation of valve coils for the pressure control in the wheel brakes. Four rotational speed sensors, one per wheel, one yaw rate sensor, one transverse acceleration sensor, one steering angle sensor, and at least one pressure sensor for the brake pressure generated indirectly or directly by the brake pedal is provided in order to detect conditions related to driving dynamics. An electronic control system which typically forms a construction unit along with a hydraulic block, in which the valves and the pump are accommodated, and on the one side of which the pump motor is arranged, controls the dynamic driving conditions of the vehicle during unstable travel. Thus, the function of the driving stability control system in critical (unstable) situations includes imparting the vehicle behavior that is desired by the driver to the vehicle, within physical limits.

In ESP control systems (ESP=Electronic Stability Program), a pressure requirement for each individual wheel is calculated from the detected instability of the vehicle, and the said pressure requirement is necessary to bring the vehicle back to the course desired by the driver. Yaw torque control ensures stable driving conditions in a cornering maneuver. Different vehicle reference models, e.g. the single-track model, can be relied on for yaw torque control. In ESP control systems, input quantities that result from the course desired by the driver (e.g. the steering angle, the speed, etc.) are always sent to the vehicle model circuit which determines a nominal value for the yaw rate from these input quantities and from parameters characteristic of the driving behavior of the vehicle as well as from quantities predetermined by ambient conditions (coefficient of friction of the roadway, side wind). The said nominal yaw rate is then compared with the actual yaw rate measured. The yaw rate difference is converted into a yaw torque which represents the input quantity of a distribution logic by means of a so-called yaw torque controller or, precisely, a yaw torque control law. The distribution logic itself determines the brake pressure to be applied to the individual wheel brakes in dependence on a brake pressure model. At least the inlet and outlet valves are actuated by a pressure control which converts pressure quantities into valve actuation signals in dependence on the real pressure increase and pressure decrease characteristics in the wheel brakes reproduced in the pressure model. The pressure model receives input quantities required herefor and, based on these and on system parameters, reproduces the pressure that prevails in the brake. More particularly, the pressure model can receive the control signals which influence the brake pressure on the respective brake under review, that is e.g. signals for the inlet valves, the outlet valves, for the hydraulic pump, or similar components. From these signals and from system parameters (for example, line cross-sections, switching characteristics, etc.), the pressure model can reproduce the pressure in the wheel brakes in parallel to the build-up of the wheel pressure so that the control circuit can be closed by outputting the pressure determined in this manner by way of the pressure model.

Prior art systems suffer from the difficulty of taking into consideration the of varying temperatures. The viscosity of brake fluid drops at low temperatures. This changes an input quantity which is taken into account in the pressure model when reproducing the wheel pressure, the pump delivery capacity or the supply volume of the pump, which increases or reduces in dependence on the temperature-responsive viscosity of the brake fluid.

To avoid discrepancies between the wheel pressure reproduced in the pressure model and the actual wheel pressure, it would be desirable to adapt the parameters that are stored in the pressure model or made available to the pressure model, especially the pump delivery capacity.

SUMMARY OF THE INVENTION

The design of the present invention, therefore, discloses a method for determining parameters for the viscosity and/or temperature of a brake fluid of a vehicle which is supplied to the wheel brakes by way of a motor-and-pump assembly equipped with actuatable valves and a hydraulic unit or hydraulic block, with which an electronic control unit is associated. The temperature of the hydraulic unit is measured by way of a temperature-sensitive element which connects the motor-and-pump assembly to the electronic control unit, and the parameters are determined by way of the temperature of the hydraulic unit. According to the present invention, the parameters for the viscosity or temperature, respectively, are forwarded to the pressure model as input quantity (quantities) for the reproduction of the brake pressures in the wheel brakes. The parameters for the viscosity or temperature can be determined from the time variation and/or the value of the measured temperature of the hydraulic unit. Advantageously, the temperature-sensitive element, in particular a temperature sensor configured as a thermistor (NTC) or thermally controlled resistor (PTC) based on temperature-responsive resistance variations, is arranged on a preferably electrically pluggable supply element which connects the motor-and-pump assembly to the electronic control unit. The motor-and-pump assembly and the electronic control unit are so attached on opposite sides to the hydraulic unit that the electric supply element interconnects both through a channel in the hydraulic unit. The channel has an inside diameter which is only slightly larger than the outside diameter of the supply element. A safe arrangement or attachment of the supply element in the channel of the hydraulic unit is achieved by way of elastic elements, preferably, spring elements which are arranged on the periphery of the supply element. A temperature sensor is arranged preferably on at least one spring element or several spring elements. A thermal contact between the temperature sensor and the hydraulic unit is established by way of the shaped spring element which projects from the periphery of the supply element. This locates the temperature sensor automatically at a point inside the hydraulic unit during the assembly of the controller (ECU), hydraulic unit, and pump, the said location permitting measurement of the temperature of the brake fluid by way of the hydraulic unit.

In another design, the temperature of the electronic control unit can also be measured by way of a temperature-sensitive element arranged on the conductor plate, and the parameters can be determined by way of the temperature of the electronic control unit.

The temperature sensor which is preferably designed as a thermistor (NTC) is connected to the ground connection of the motor-and-pump assembly. This reduces the number of the sensor connections on the plate of the electronic control unit.

The temperature values determined are forwarded as input quantities to a pressure model which reproduces the actual pressures of the brake pressure in the wheel brakes. The pressure increase and/or pressure decrease characteristic curves of the pressure model are modified in dependence on the temperature values. By means of the parameters supplied to the brake pressure model, parameters stored, calculated or input in the pressure model, such as the pump delivery capacity, the supply volume, as well as values derived from the parameters, are modified or corrected corresponding to the defined parameters for the viscosity or temperature of the brake fluid.

The wheel pressure reproduced on the pressure model is adapted to the actual wheel pressure according to the following relations.

One embodiment of the present invention is illustrated in the accompanying drawings and will be described in detail in the following.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

FIG. 5 shows the dependency of the pump delivery capacity on the temperature of the brake fluid.

DETAILED DESCRIPTION OF THE PREFERRED EMBODIMENT

Figure 1:
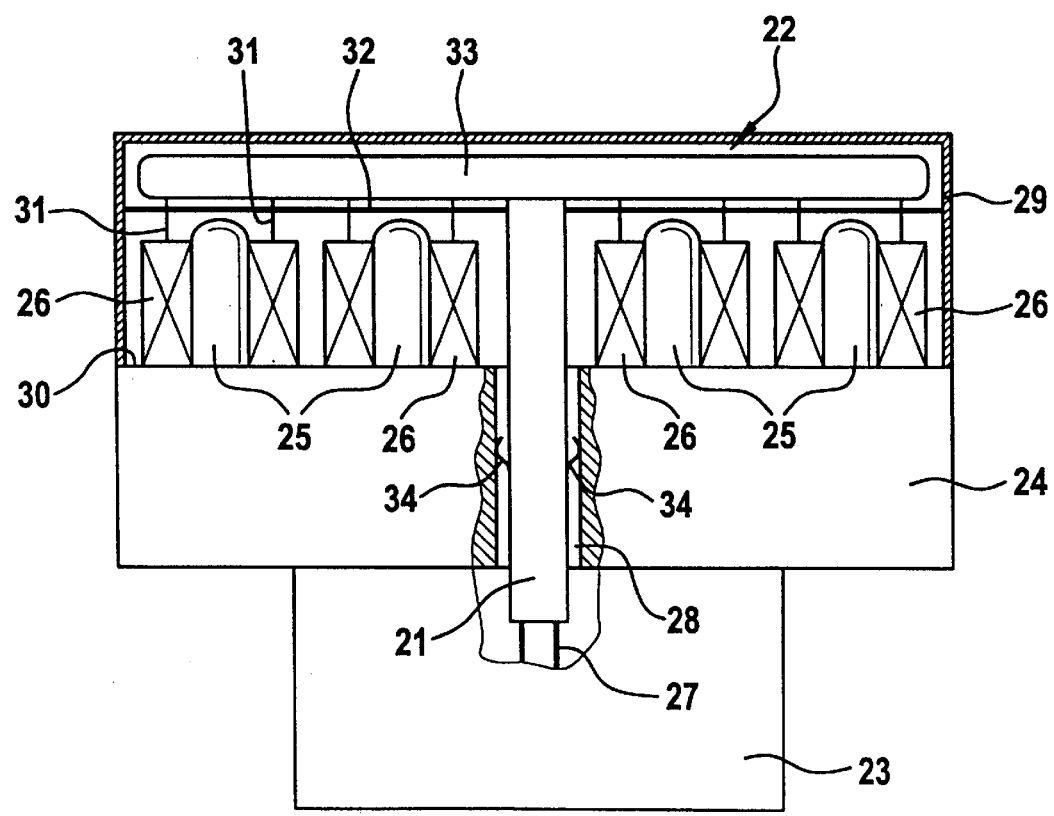
FIG. 1 is a view of a motor-and-pump assembly of the present invention With valves operable by valve coils.

FIG. 1 shows a pressure control device which is generally comprised of a hydraulic block or a hydraulic unit 24 and a cover or housing 29. Projecting from this hydraulic block 24, in a known fashion, are the individual valve domes or valve housing 25 in which the valve parts (not shown) movable by magnetic force are arranged. A hydraulic block of this type for an ABS with a control on each individual wheel in general comprises eight valves of this type, namely four inlet valves and four outlet valves, two separating valves and two change-over valves, while a hydraulic block for an ESP with a control on each individual wheel in general contains twelve valves of the type mentioned above. The valve actuation force is known to be generated by a magnetic field which, from a valve coil 26 through the valve housing 25, acts upon non-illustrated valve members arranged in the interior of the valve housing 25.

The valve coils 26 are elastically arranged and retained in the cover or housing 29 so that when the housing 29 is seated on the hydraulic block 24, they move into abutment on the associated valve housings 25 and on the base surface 30 of the hydraulic unit 24. By means of flexible connecting wires 31, the valve coils 26 are connected to a plate 32 and a printed circuit board 33 on which the control electronics are fitted.

The individual valve coils 26 are composed of a coil (not shown) and a steel jacket which determines the course of the magnetic field lines of flux.

The connecting element 21 connects the electronic control unit 22 (the controller) in which the electronic stability program (ESP) is stored to the pump motor 23 which is arranged opposite to the controller on the hydraulic block 24. The connecting element 21 is configured as an electric plug-on supply element which supplies the electric energy furnished by the electronic control system to the pump motor 23 and/or the valves of the brake system. Motor-and-pump assemblies are known in the art and, therefore, need not be described in more detail. The connecting element 21 is e.g. configured cylindrically and includes a plug-on contact element 27 for the electrically conductive attachment which is slipped into a terminal associated with the pump motor. The connecting element 21 is arranged within a channel 28 of the hydraulic block 24 and contacts the wall of the channel 28 of the hydraulic block 24 by way of elastic elements 34 provided on the periphery. An enlarged section of the connecting element 21 is illustrated schematically in FIG. 2. A temperature sensor 35 is arranged on at least one of the elastic elements 34 and measures the temperature of the hydraulic block 24 through which the brake fluid flows. Preferably, NTC sensors are used as temperature sensors.

In a preferred manner, springs as elastic elements which point to the channel 28 are attached to the periphery of the connecting element 21. Besides providing an elastic mechanic mounting support of the connecting element 21, these springs serve to establish a thermal contact between the temperature sensor 35 and the hydraulic block 24. The temperature sensor 35 abuts on the wall of the channel 28 secured by the force (spring force) of the elastic element 34.

Figure 3:
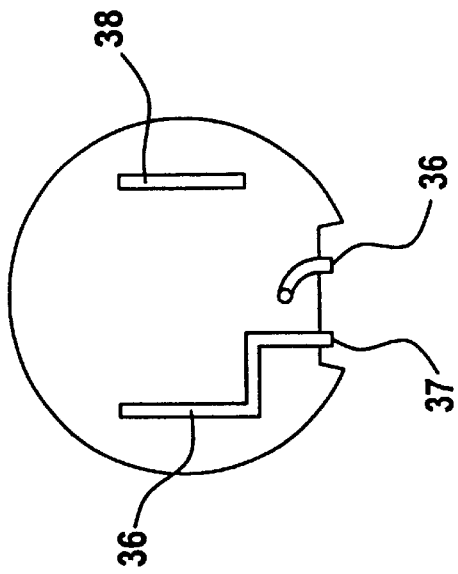
FIG. 3 is a view of the ground connection according to FIG. 4.
Figure 2:
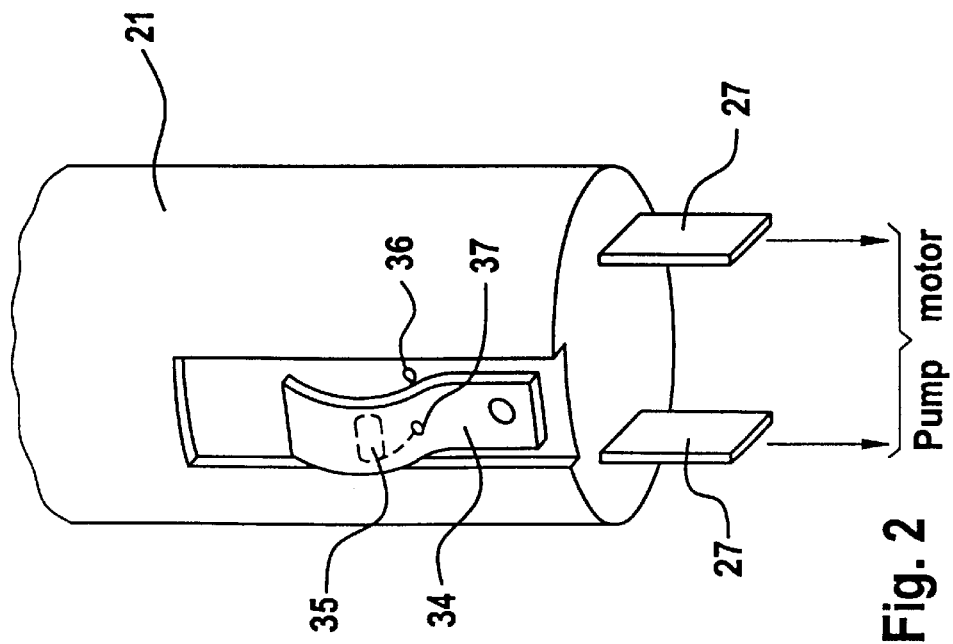
FIG. 2 is a view of the supply element with a temperature sensor.
Figure 4:
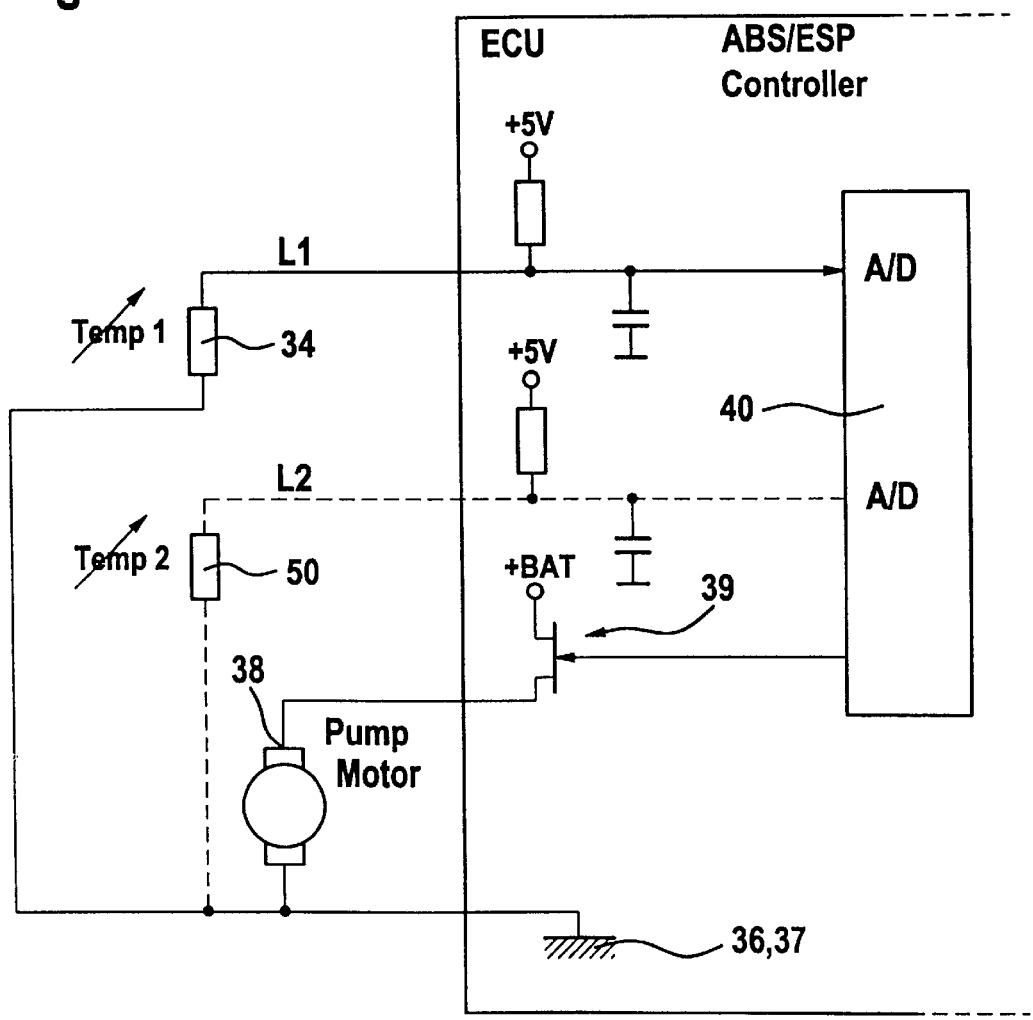
FIG. 4 is a circuit for determining the temperature with the temperature sensor of FIG. 2.

As is shown in FIG. 3 in connection with FIG. 2 and FIG. 4, the ground connection 36 of the pump motor is designed so that the ground connection 37 of the temperature sensor 35 is connected to the ground connection 36 of the pump motor. The supply connection 38 is connected to a battery 39 of a vehicle.

FIG. 4 shows a circuit with at least one temperature sensor 34 which is schematically illustrated as a voltage controller. The connection of a possible second temperature sensor 50 (redundance) is shown in broken lines. When the pump motor 23 is supplied with current due to a control operation, a voltage which depends on the supply current declines on the resistor 34, the said voltage being conducted to an analog/digital converter 40 which is arranged within a signal-processing unit (microprocessor). For the case that the ambient temperature lies below 0° C., preferably is lower than or equal to −10° C., the voltage measured by the temperature sensor 34 will rise. Thus, a signal is applied to the analog/digital converter 40 which is available to the microprocessor. This signal is used to modify brake pressure which reproduces the actual wheel pressures in the pressure model by providing it as an input quantity to the pressure model. The pump delivery capacity stored in the pressure model is corrected in response to the temperature values. FIG. 4 shows the relationship of the pump delivery capacity influenced by the temperature of the brake fluid and, thus, the viscosity. When the temperature of the brake fluid drops below 10° C., the capacity of the pump decreases almost proportionally to the temperature. The correction of the pump delivery capacity can be modified in dependence on the temperature variation determined by way of the variation of the resistance of the temperature sensor or by a temperature threshold value (−10°C. or −15°C.) by taking correction factors into account.

The pressure increase and pressure decrease curves which reproduce the actual wheel pressures are modified by means of the corrected pump delivery capacity. As a result of the modified pressure increase and pressure decrease curves of the pressure model, the valves of the brake system are e.g. actuated for a longer time during brake pressure build-up at a higher viscosity of the brake fluid, in particular below a temperature of −10° C. The result is that the actual wheel pressure sooner reaches the brake pressure demanded by driving dynamics control.

A time element ensures that a cooling time interval during which the valve coil adopts the ambient temperature prevails between the termination of the old driving cycle and the; resuming of a new driving cycle.

While the above description constitutes the preferred embodiment of the present invention, it will be appreciated that the invention is susceptible to modification, variation and change without departing from the proper scope and fair meaning of the accompanying claims.

I claim:

1. A method for determining parameters for the viscosity or temperature of a brake fluid of a vehicle which is supplied to the wheel brakes by way of a hydraulic unit with which an electronic control unit is associated, the hydraulic unit having a motor-and-pump assembly equipped with actuatable valves situated on the hydraulic unit, the hydraulic unit defining a channel linking the motor-and-pump assembly to the electronic control unit wherein the temperature of the hydraulic unit is measured by way of a temperature-sensitive element arranged within the hydraulic unit and in thermal contact with an interior surface of the channel of the hydraulic unit, and the parameters are determined by way of the temperature of the hydraulic unit.

2. The method as claimed in claim 1, wherein the temperature-sensitive element is a resistance temperature sensor.

3. The method as claimed in claim 1, wherein the parameters are forwarded as input quantities to a pressure model which reproduces the actual pressures of the brake fluid in the wheel brakes, and in that in dependence on the parameters, especially the temperature values, the pressure increase and/or pressure decrease characteristic curves of the pressure model are modified in dependence on the pump delivery capacity.

4. The method as claimed in claim 1, wherein a temperature sensor is on an element which connects a motor-and-pump assembly to an electronic control unit.

5. The method as claimed in claim 4, wherein the element is configured as an electrically pluggable supply element and electrically connects the electronic control unit to the pump motor and/or the valves.

6. The method as claimed in claim 4, wherein the element is arranged in a channel of the hydraulic unit and abuts on the channel by way of at least one elastic element.

7. The method as claimed in claim 6, wherein at least one elastic element is designed as a spring and carries at least one temperature sensor.

8. The method as claimed in claim 5, wherein the temperature sensor and the supply element have a common ground connection.

9. The method as claimed in claim 1, wherein the hydraulic unit defines a channel therein, and wherein the temperature-sensitive element is positioned within the channel.

10. The method as claimed in claim 9, wherein the electronic control units and motor-and-pump assembly are located on opposing sides of the channel.

11. The method as claimed in claim 1, the method determining parameters for the viscosity of temperature of the brake fluid during temperatures below 0 degree Celsius.

12. The method as claimed in claim 1, wherein the motor-and-pump assembly is situated directly on the hydraulic unit and in communication with the channel.

13. A method for determining parameters for the viscosity or temperature of a brake fluid of a vehicle which is supplied to the wheel brakes by way of a motor-and-pump assembly equipped with actuatable valves and a hydraulic unit with which an electronic control unit is associated, comprising the steps of:

measuring the temperature of thee hydraulic unit by way of a temperature-sensitive element positioned on an electrically pluggable supply element that electrically connects the electronic control unit to the pump motor and/or the valves; and determining the parameters by way of the temperature of the hydraulic unit.

14. The method as claimed in claim 13, wherein the temperature sensor and the supply element have a common ground connection.

15. The method as claimed in claim 13, wherein the parameters are forwarded as input quantities to a pressure model which reproduces the actual pressures of the brake fluid in the wheel brakes, and in that in dependence on the parameters, especially the temperature values, the pressure increase and/or pressure decrease characteristic curves of the pressure model are modified in dependence on the pump delivery capacity.

16. The method as claimed in claim 13, wherein the element is arranged in a channel of the hydraulic unit and abuts on the channel by way of at least one elastic element.

17. A method for determining parameters for the viscosity or temperature of a brake fluid of a vehicle which is supplied to the wheel brakes by way of a motor-and-pump assembly equipped with actuatable valves and a hydraulic unit with which an electronic control unit is associated, comprising the steps of measuring the temperature of the hydraulic unit by way of at least one temperature-sensitive element positioned on an element which connects the motor-and-pump assembly to the electronic control unit, the element arranged in a channel of the hydraulic unit and abutting on the channel by way of at least one elastic element designed as a spring carrying the at least one temperature-sensitive element; and determining the parameters by way of the temperature of the hydraulic unit.

18. The method as claimed in claim 17, wherein the parameters are forwarded as input quantities to a pressure model which reproduces the actual pressures of the brake fluid in the wheel brakes, and in that in dependence on the parameters, especially the temperature values, the pressure increase and/or pressure decrease characteristic curves of the pressure model are modified in dependence on the pump delivery capacity.

19. The method as claimed in claim 17, wherein the element is configured as an electrically pluggable supply element and electrically connects the electronic control unit to the pump motor and/or the valves.

* * * * *

UNITED STATES PATENT AND TRADEMARK OFFICE
CERTIFICATE OF CORRECTION

PATENT NO. : 6,807,848 B1
DATED : October 26, 2004
INVENTOR(S) : Helmut Fennel et al.

It is certified that error appears in the above-identified patent and that said Letters Patent is hereby corrected as shown below:

Title page,
Item [73], Assignee, delete "KG," and substitute -- OHG, -- in its place.
Item [56], References Cited, FOREIGN PATENT DOCUMENTS, delete "39 12 235" and subsitute -- 39 12 234 -- in its place.

Column 6,
Line 58, after "temperature of" delete "thee" and substitute -- the -- in its place.

Signed and Sealed this

Eighth Day of February, 2005

JON W. DUDAS
*Director of the United States Patent and Trademark Office*